United States Patent [19]

Bishop

[11] 3,763,514
[45] Oct. 9, 1973

[54] PIT-TYPE DOCK LEVELER
[75] Inventor: John Larry Bishop, Bethany, Okla.
[73] Assignee: DLM, Inc., Oklahoma City, Okla.
[22] Filed: May 6, 1971
[21] Appl. No.: 140,857

[52] U.S. Cl. .................................. 14/71
[51] Int. Cl. ............................. B65g 11/00
[58] Field of Search ................................ 14/71, 72

[56] References Cited
UNITED STATES PATENTS

| | | | |
|---|---|---|---|
| 3,203,002 | 8/1965 | McGuire | 14/71 |
| 3,308,497 | 3/1967 | Lambert | 14/71 |
| 3,137,017 | 6/1964 | Pfleger | 14/71 |
| 3,249,956 | 5/1966 | Zajac | 14/71 |
| 3,323,158 | 6/1967 | Loomis | 14/71 |
| 3,199,133 | 8/1965 | Ramer | 14/71 |
| 3,368,229 | 2/1968 | Pfleger | 14/71 |

Primary Examiner—Nile C. Byers, Jr.
Attorney—Dunlap, Laney, Hessin & Dougherty

[57] ABSTRACT

A dock leveler for installation in a pit formed in a loading dock to span the distance from the loading dock to thv bed of a vehicle which is in proper position to be loaded or unloaded and more particularly, a dock leveler which includes a supporting frame mounted in the pit, a ramp member pivotally secured at its rear edge to the supporting frame, a lip member pivotally secured at its rear edge to the front edge of the ramp member for movement between a downwardly folded position to an extended cantilever position, a lip extending mechanism for automatically extending thv lip member, a lip latching mechanism for releasably locking the lip member in a fully extended cantilever position, a mechanism for upwardly biasing the ramp member relative to the support frame, and a mechanism for automatically returning the ramp member to the supported cross-traffic position flush with the surrounding dock floor.

21 Claims, 9 Drawing Figures

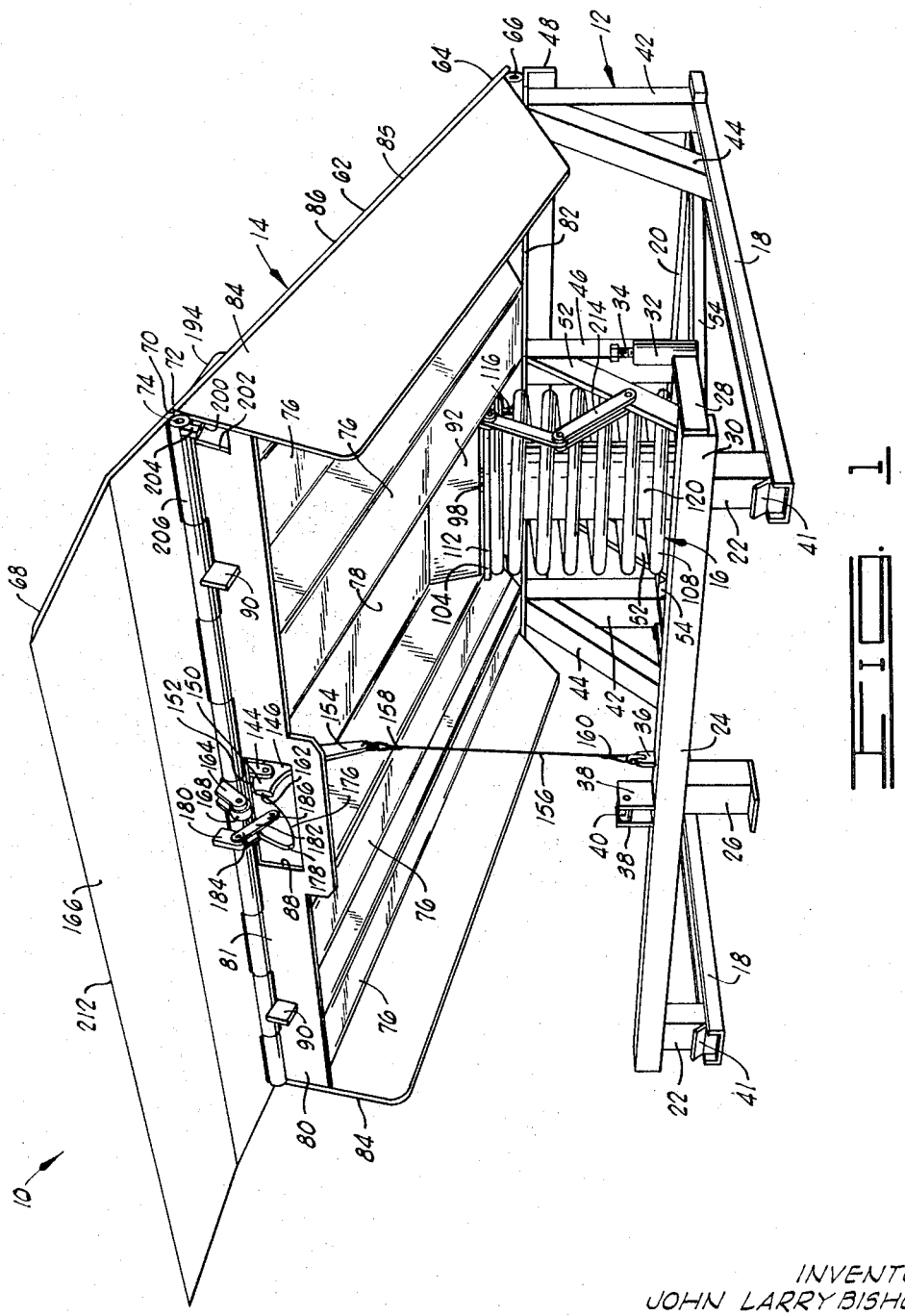

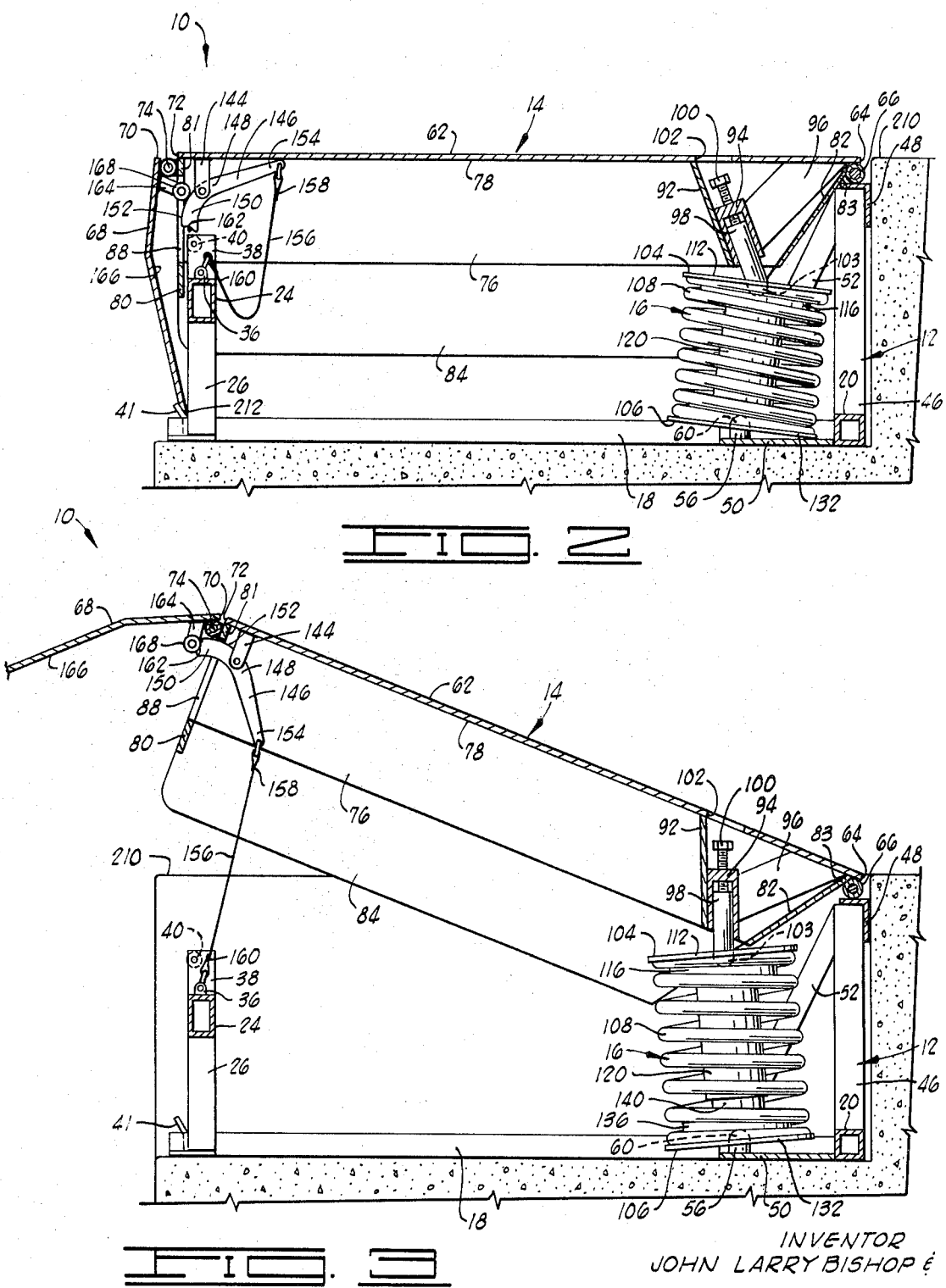

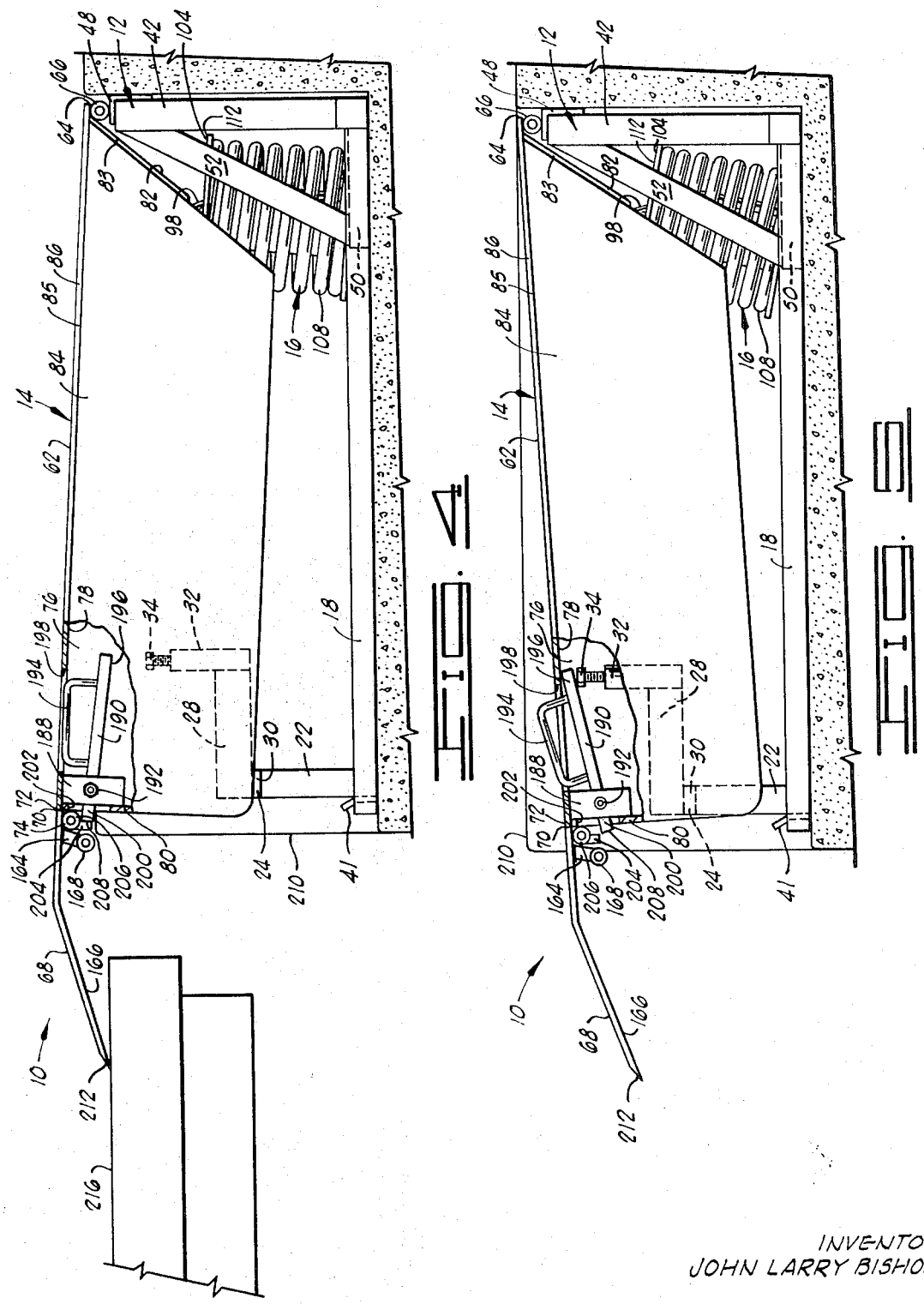

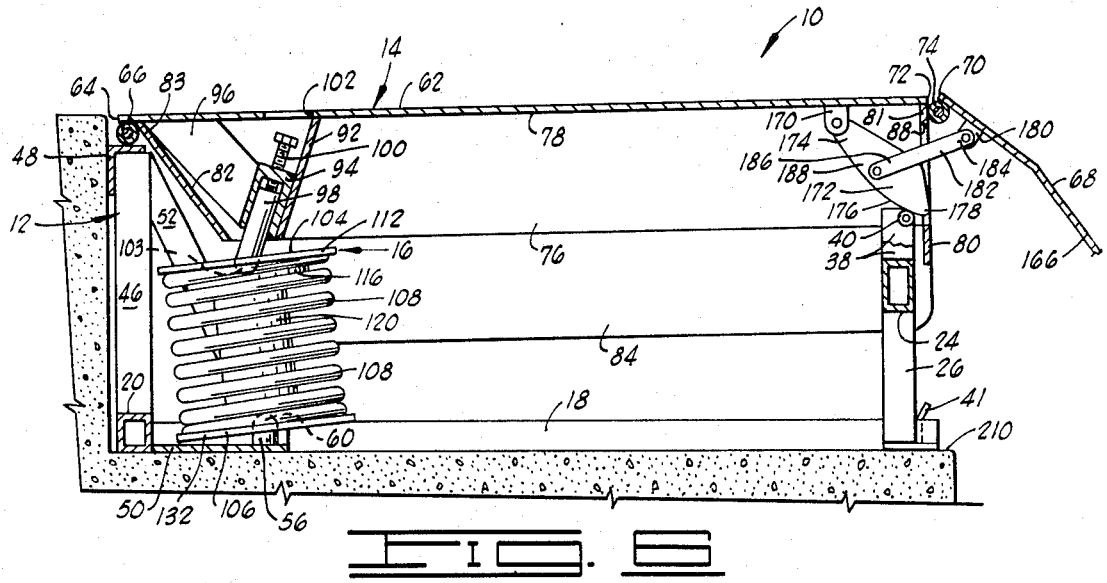
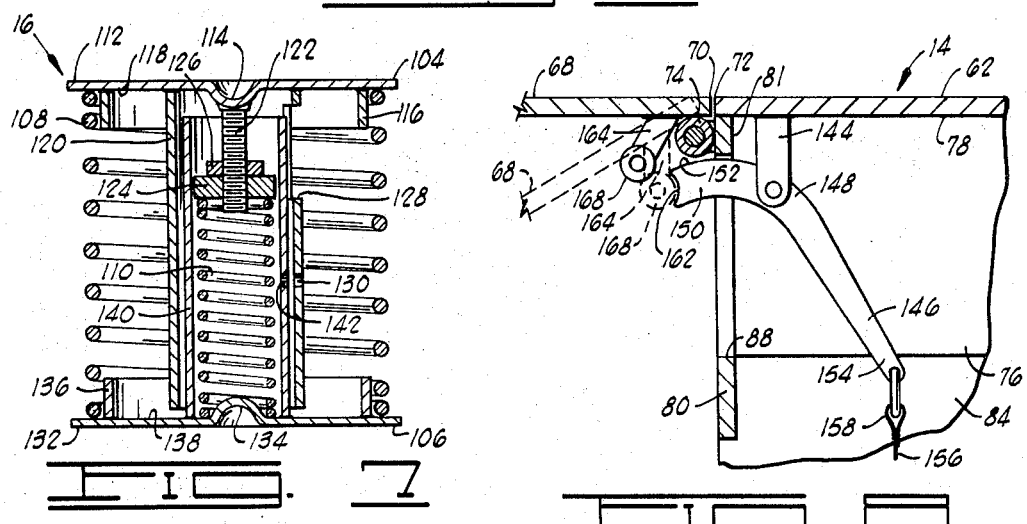
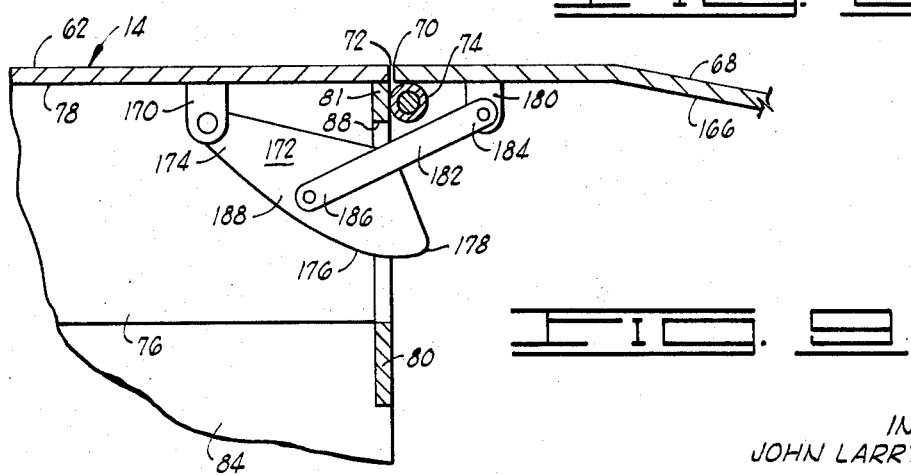

PIT-TYPE DOCK LEVELER

BACKGROUND OF THE INVENTION

1. Field of the Invention

This invention relates to dock levelers, and more particularly, to dock levelers of the type mounted in a pit formed in a loading dock.

2. Description of the Prior Art

The prior art contains many teachings of pit-type dock levelers each comprising a support frame, a ramp member pivotally secured to the support frame and a lip member pivotally secured to the ramp member. Various elaborate schemes are disclosed for automatically or semi-automatically elevating the ramp members and for extending the lip members attached thereto.

Many of the prior pit-type dock leveler designs do not provide for the automatic return of the ramp member to the horizontal cross-traffic position flush with the surrounding dock when a truck or like vehicle drives away from the dock while the dock leveler is supported by the fully extended lip member which is in turn supported by the truck. Still ther pit-type dock leveler designs, while providing for return of the ramp member to the horizontal cross-traffic position when the ramp member is released from an operating position above the level of the surrounding flat floor, do not provide for the return of the ramp member to the horizontal cross-traffic position when released from an operating position elow the level of the surrounding dock floor.

The great majority of existing pit-type dock leveler designs utilize multiple tension springs and elaborate cam and roller combinations actuated through elaborate linkage to provide upward biasing of the ramp member relative to the support frame. These particular designs require a great number of working parts which increases the possibility of down time for a particular pit-type dock leveler throughout its operating life.

SUMMARY OF THE INVENTION

The apparatus of the present invention contemplates a pit-type dock leveler comprising a frame, having a front portion, an upper rear portion and a lower rear portion, and a ramp member, having a top side, a bottom side, a front edge and a rear edge, which is pivotally secured along the rear edge thereof to the upper rear portion of the frame for pivoting movement thereon about a horizontal axis. Biasing means is provided which is carried by the frame and upwardly biases the ramp member relative to the frame. A lip member, having a top side, a bottom side, a front edge and a rear edge, is pivotally secured at the rear edge thereof to the front edge of the ramp member. The lip member pivots between an extended cantilever position, lying substantially in the plane of the ramp member, and a downwardly folded position, lying in a plane substantially normal to the plane of the ramp member. A lip extending member is pivotally secured at the medial portion thereof to the bottom side of the ramp member adjacent the front edge thereof, the first end of the lip extending member being in operative contact with the bottom side of the lip member whereby upward rotation of the first end of the lip extending member about its pivot point causes a resulting upward rotation of the lip member about its pivotal connection with the ramp member to an extended cantilever position. Means, responsive to the upward pivoting movement of the ramp member, is provided for pivoting the lip extending member, said means interconnecting the second end of the lip extending member and the front portion of the frame.

An object of the present invention is to provide a pit-type dock leveler having simplified means for upwardly biasing the ramp member relative to the support frame.

Another object of the present invention is to provide a pit-type dock leveler having means for automatically elevating the ramp member from an operating position below the level of the surrounding dock floor to a horizontal cross-traffic position flush with the surrounding dock floor in the event that the vehicle upon which the extended lip member is resting pulls away from the dock.

A further object of the present invention is to provide a pit-type dock leveler which includes actuation means for automatically extending the lip member upwardly and outwardly from the ramp member in response to the upward rotation of the ramp member about its pivotal connection to the support frame.

Yet another object of the present invention is to provide a pit-type dock leveler requiring a minimum amount of manual effort to place it in operating position.

A still further object of the present invention is to provide a pit-type dock leveler which is economical in construction and operation and is virtually maintenance-free.

Other objects and advantages of the present invention will be evident from the following detailed description when read in conjunction with the accompanying drawings.

BRIEF DESCRIPTION OF THE DRAWINGS

FIG. 1 is a perspective view of the dock leveler illustrating the ramp member in an elevated position.

FIG. 2 is a side elevation view, partially in cross-section, illustrating the dock leveler in the horizontal cross-traffic position.

FIG. 3 is a side elevation view, partially in cross-section, illustrating the dock leveler with the lip member partially extended.

FIG. 4 is a side elevation view, with portions of the dock leveler broken away, illustrating the dock leveler with the lip member in contact with the truck bed and in a fully extended position.

FIG. 5 is a side elevation view, with portions of the dock leveler broken away, illustrating the ramp member in its lowest position below the loading dock floor with the lip member released and free to fall to a downwardly folded position.

FIG. 6 is a side elevation view, partially in cross-section, illustrating the ramp member slightly elevated above the surrounding loading dock floor.

FIG. 7 is an enlarged elevation view, in cross-section, illustrating details of the spring assembly.

FIG. 8 is an enlarged elevation view, partially in cross-section, illustrating details of the lip member elevating mechanism.

FIG. 9 is an enlarged elevation view, partially in cross-section, illustrating details of the ramp elevating mechanism.

DESCRIPTION OF THE PREFERRED EMBODIMENT

Referring now to the drawings and, more particularly, to FIG. 1, the apparatus of the present invention is generally designated by reference character 10. The dock leveler 10 comprises a frame 12, a ramp member 14 carried by the frame and a spring assembly 16 for upwardly biasing the ramp member 14 relative to the frame 12.

The frame 12, preferably constructed of structural steel, comprises a pair of horizontal side members 18 each connected at one end thereof to a respective end of a horizontal lower rear cross member 20. A front vertical member 22 is fixedly secured to the respective opposite end of each side member 18 and extends upwardly therefrom. A front cross member 24 is supported by and fixedly secured to the upper end of each of the front vertical members 22 in a horizontal position. The front cross member 24 is supported at its medial portion by a center front vertical member 26 fixedly secured thereto and extending downwardly therefrom.

A pedestal support member 28 is fixedly secured to one end 30 of the front cross member 24 and extends horizontally rearwardly therefrom. A vertical pedestal 32 is formed on the rearward portion of the pedestal support member 28 and extends upwardly therefrom. The pedestal 32 includes a vertically oriented bolt 34 threaded into the upper end thereof and providing height adjustment for the pedestal.

A steel bracket 36 is formed on the upper medial portion of front cross member 24 and extends upwardly therefrom. Two steel brackets 38 are formed on the upper medial portion of the front cross member 24 and extend upwardly therefrom in parallel relation. A hardened steel ramp elevating roller 40 is horizontally journaled on the brackets 38 and is carried therebetween. A steel bracket 41 is formed on the front side of each front vertical member 22 and extends forwardly and upwardly therefrom.

An outer rear vertical member 42 is fixedly secured to each end of the lower rear cross member 20 and extends upwardly therefrom. An inclined outer rear brace 44 interconnects the upper end portion of each outer rear vertical member 42 and the upper portion of the respective adjacent side member 18. Two inner rear vertical members 46 are fixedly secured to the medial portion of the lower rear cross member 20 and extend upwardly therefrom in parallel relation. A horizontally oriented upper rear cross member 48 is supported by and fixedly secured to the respective upper ends of the outer rear vertical members 42 and the inner rear vertical members 46.

A spring support channel 50 is fixedly secured to the medial portion of the lower rear cross member 20 and extends horizontally forwardly therefrom. See FIGS. 2 and 4. An inclined brace 52 interconnects the upper end portion of each inner rear vertical member 46 and a respective forward portion of the spring support channel 50. A horizontal brace 54 interconnects each respective outer end portion of the lower rear cross member 20 and a respective forward portion of the spring support channel 50. A cylindrically shaped steel spring support pedestal 56 is formed on the upper surface 58 of the spring support channel 50 and extends vertically upward therefrom. The upper portion 60 of the spring support pedestal 56 is spherical in shape.

The ramp member 14, preferably constructed of structural steel, comprises a ramp plate 62 which is pivotally secured at its rear edge 64 to the upper rear cross member 48 by means of hinge 66, and a lip member 68 which is pivotally secured at its rear edge 70 to the front edge 72 of the ramp member 62 by means of hinge 74. Four box members 76, conveniently formed of sheet steel, are fixedly secured to the bottom side 78 of the ramp plate 62. The box members 76 extend from the rear edge 64 of the ram plate 62 to the front edge 72 of the ramp plate 62 and are aligned in parallel relation. The front ends of the box members 76 are fixedly secured to a front plate 80 which extends the full width of the ramp plate 62. The front plate 80 is fixedly secured along its upper edge 81 to the front edge 72 of the ramp member 62. The rear ends of the box members 76 are fixedly secured to a rear plate 82 which extends the full width of the ramp plate 62 adjacent the rear edge 64 thereof. The rear plate 82 is fixedly secured along its upper edge 83 to the rear edge 64 of the ramp plate 62. A side plate 84 is fixedly secured along its upper edge 85 to each side edge 86 of the ramp plate 62 and extends downwardly therefrom. Each side plate 84 is also secured to the respective end of the front plate 80 and the rear plate 82 adjacent the respective side edge 86 of the ramp plate 62. An opening 88 is formed in the medial portion of the front plate 80. Two steel lip stops 90 are formed on the front plate 80 and extend forwardly therefrom.

A pedestal mounting plate 92 is transversely mounted between the two interior box members 76 and is fixedly secured to the two interior box members 76 and the bottom side 78 of the ramp plate 62. The pedestal mounting plate 92 is inclined at an angle less than 90° to the bottom side 78 of the ramp plate 62 and extends downwardly and rearwardly therefrom. A pedestal carrier 94 is fixedly secured to the medial portion of the pedestal mounting plate 92 and is provided with additional bracing by steel gusset plate 96 which interconnects the pedestal carrier 94 and the bottom side 78 and the ramp plate 62. A cylindrically shaped steel spring support pedestal 98 is slideably carried in the pedestal carrier 94 and is slideably adjustable in the pedestal carrier 94 by means of an adjusting bolt 100 threaded in the upper portion of the pedestal carrier 94 and axially aligned with the spring support pedestal 98. An aperture 102 is formed in the ramp plate 62 in axial alignment with the adjusting bolt 100. The aperture 102 provides access to the head of the adjusting bolt 100 for adjusting spring loading. The lower end 103 of the spring pedestal 98 is spherical in shape.

The spring assembly 16, as shown in FIG. 7, comprises an upper spring carrier 104, a lower spring carrier 106, a first compression spring 108 and a second compression spring 110 carried by the upper and lower spring carriers 104 and 106. The upper spring carrier 104 comprises a steel upper spring plate 112 of circular shape and having an upper socket 114 formed in the center thereof. A cylindrically shaped steel upper spring retainer ring 116 is fixedly secured to the inner surface 118 of the upper spring plate 112 and aligned concentric therewith. A cylindrically shaped steel outer tube 120 is also fixedly secured to the inner surface 118 of the upper spring plate 112. The outer tube 120 is aligned normal to the plane of the upper spring plate 112 and is concentric with the upper spring retainer ring 116. A threaded steel rod 122 is fixedly secured to the inner surface 118 of the upper spring plate 112 at the center of the upper spring plate 112 and extends therefrom in coaxial alignment with the outer tube 120. An adjusting nut 124 is threaded on the threaded rod 122. A locking nut 126 is threaded on the threaded rod 122 between the adjusting nut 124 and the upper spring plate 112. An aperture 128 is formed in the wall of the outer tube 120 to provide access to the adjusting nut 124 and the locking nut 126. A clear hole 130 is also formed in the wall of the outer tube 120.

The lower spring carrier 106 comprises a steel lower spring plate 132 of the circular shape and having a lower socket 134 formed in the center thereof. A cylindrically shaped steel lower spring retainer ring 136 is fixedly secured to the inner surface 138 of the lower spring plate 132 and is positioned concentric therewith. A cylindrically shaped steel inner tube 140 is fixedly secured to the inner surface 138 of the lower spring plate 132 and is aligned normal to the plane of the lower spring plate 132 in axial alignment with the center of the lower spring plate 132 and concentric with the lower spring retaining ring 136. The inner tube 140 has an outer diameter slightly smaller than the inner diaeter of the outer tube 120 whereby it may conveniently telescope within the outer tube 120. A clear hole 142 is also formed in the wall of the inner tube 140.

The first compression spring 108 is supported at one end thereof by the lower spring carrier 106 and is supported at the opposite end by the upper spring carrier 104. The inside diameter of the first compression spring 108 is slightly larger than the outside diameter of the upper and lower spring retainer rings 116 and 136 thereby allowing the respective ends of the first compression ring 108 to conveniently seat around the upper and lower spring retainer rings 116 and 136 while bearing against the inner surfaces 118 and 138 of the respective upper spring plate 112 and lower spring plate 132.

The second compression spring 110 is carried within the inner tube 140 of the lower spring carrier 106. The second compression spring 110 is supported at one end thereof by the inner surface 138 of the lower spring plate 132. The opposite end of the second compression spring 110 bears against the adjusting nut 124 carried by the upper spring carrier 104. Variation of the loading of the second compression spring 110 is accomplished by movement of the adjusting nut 124 on the threaded rod 122. The adjusting nut 124 may be locked in any desired position on the threaded rod 122 by jamming the locking nut 126 into the adjusting nut 124.

When installed in the dock leveler 10, the spring assembly 16 is supported by the frame 12 at its lower end by the spring support pedestal 56 whose spherical end 60 is seated in the lower socket 134 of the lower spring carrier 106. The upper end of the spring assembly 16 is engaged with the ramp member 14 by means of the spring support pedestal 98 whose spherical end 103 is seated in the upper socket 114 of the upper spring carrier 104. Variation of the loading of the first compression spring 108 is accomplished by axial movement of the spring support pedestal 98 in the pedestal carrier 94 by turning the adjusting bolt 100. The adjusting bolt 100 may be accessed by a socket wrench through the aperture 102 formed in the ramp plate 62.

The clear holes 130 and 142 formed in the respective outer tube 120 and inner tube 140 are positioned such that the hole 130 is superimposed on the hole 142 when the spring assembly 16 is fully compressed. A locking pin (not shown) may then be passed through both holes 130 and 142 thereby locking the spring assembly 16 in its fully compressed position.

Referring now to FIG. 8, a steel bracket 144 is formed on the bottom side 78 of the ramp plate 62 adjacent the front edge 72 thereof. A steel lip extending member 146 is pivotally secured at its medial portion 148 to the bracket 144. The first end 150 of the lip extending member 142 extends forwardly through the opening 88 in the front plate 80. A convex cam surface 152 is formed on the upper edge of the first end 150 of the lip extending member 146. The second end 154 of the lip extending member 146 extends rearwardly and downwardly from the bracket 144. A flexible steel cable 156 is secured at the first end 158 thereof to the second end 154 of the lip extending member 146, and is secured at the second end 160 thereof to the bracket 36 formed on the front cross member 24 of the frame 12. A depression 162 is formed in the first end 150 of the lip extending member 146. A steel bracket 164 is formed on the bottom side 166 of the lip member 78 adjacent the hinge 74. A hardened steel roller 168 is journaled on the bracket 164 and is adapted to rollingly engage the convex cam surface 152 and the depression 162 under certain conditions which will be described hereinafter in greater detail.

Referring now to FIG. 9, a steel bracket 170 is formed on the bottom side 78 of the ramp plate 62 near the front edge 72 thereof. A steel ramp elevating member 172 is pivotally secured at the first end 174 thereof to the bracket 170. A convex cam surface 176 is formed on the lower edge of the ramp elevating member 172 adjacent the second end 178 thereof said cam surface 176 continuing around the second end 178 of the ramp elevating member 172 in an upward direction. A steel bracket 180 is formed on the bottom side 166 of the lip member 68 adjacent the hinge 74. A rigid steel link 182 is pivotally secured at the first end 184 thereof to the bracket 180, and is pivotally secured at the second end 186 thereof to the medial portion 188 of the ramp elevating member 172. The convex cam surface 176 is adapted to rollingly engage the ramp elevating roller 40 journaled on the front cross member 24 of the frame 12 under certain conditions which will be described hereinafter in greater detail.

FIGS. 4 and 5 more clearly illustrate the latching mechanism for locking the lip member 68 in its fully extended position. A vertically oriented steel plate 188 is fixedly secured at its upper edge to the bottom side 78 of the ramp plate 62 adjacent the front plate 80. The plate 188 is fixedly secured at its lower end to the front plate 80. A latch member 190 is journaled on a horizontally oriented bolt 192 which spans between the plate 188 and an adjacent box member 76, the bolt 192 being fixedly secured at its respective ends to the box member 76 and the plate 188. A hand grip 194 is formed on the first end portion 196 of the latch member 190 and extends upwardly therefrom. The hand grip 194 may be conveniently grasped by an operator through an elongated opening 198 formed in the ramp plate 62 along its respective side edge 86 adjacent the latch member 190.

The second end portion 200 of the latch member 190 extends forwardly from the ramp member 14 through an elongated opening 202 formed in the front plate 80 adjacent the plate 188. A steel detent 204 is formed on and extends downwardly from an element 206 of the hinge 74, said element 206 being fixedly secured to the bottom side 166 of the lip member 68. A detent engaging surface 208 is formed on the second end portion 200 of the latch member 190 and is adapted to abut the detent 204 when the lip member 68 is in its fully extended position. The first end portion 196 of the latch member 190 is constantly urged downward by gravity thereby resulting in the upward biasing of the second end portion 200 as the latch member 190 pivots about the bolt 192 in response to the gravitational urging. The hand grip 194 provides means for manually releasing the lip member 68 from its fully extended position and further provides means for the lifting of the ramp member 14 by an operator as will be described in greater detail hereinafter. FIG. 4 illustrates the latching mechanism when the lip member 68 is latched in its fully extended position while FIG. 5 illustrates the latching mechanism when the lip member 68 is in the unlatched position and is free to fall downwardly.

The pedestal 32 and the bolt 34 carried by the frame 12 are in vertical alignment with the first end portion 196 of the latch member 190. When the ramp member 14 reaches its lowest position with the lip member 68 fully extended, the bolt 34 contacts the first end portion 196 of the latch member 190 thereby upwardly urging the first end portion 196 with a resulting unlatching of the fully extended lip member 68 thus allowing the unsupported lip member 68 to fall to a downwardly folded pendent position. See FIG. 5.

It may therefore be readily seen that the lip member 68 may be latched in a fully extended position and may be unlatched either manually by the operator or automatically upon the actuation of the latch member 190 by the bolt 34 carried by the frame 12 when the ramp member 14 reaches its lowest position. The latter action occurs most often when a truck or other vehicle, which has been loaded or unloaded at the loading dock, pulls away while the lip member 68 is fully extended and is resting on the bed of the vehicle.

It should be further noted that a power cylinder of the hydraulic or pneumatic type may be substituted for the spring assembly 16 in the dock leveler 10 thus eliminating all manual labor from the operation of the dock leveler.

OPERATION

In operation, the frame 12 of the dock leveler 10 is supported in a pit formed in the loading dock 210. The depth of the pit is such that the ramp plate 62 is flush with the surrounding loading dock surface when the ramp member 14 is in the horizontal cross-traffic position.

When in the stowed or cross-traffic position, the ramp member 14 is supported at its front edge by the lip member 68. In this position, the lip member 68 extends downwardly from the hinge 74 with the bottom side 166 thereof bearing against the lip stops 90 and with the front edge 212 thereof bearing on and being supported by the brackets 41 formed on the frame 12. In this position the dock leveler 10 will support any cross-traffic, such as a fork-lift truck, which might pass over it when not in use.

As noted above, the first and second compression springs 108 and 110 of the spring assembly 16 may each be independently adjusted to exert upward urging upon the ramp member 14. In the cross-traffic position, the springs 108 and 110 of the spring assembly 16 are adjusted such that the upward moment exerted by the spring assembly 16 on the ramp member 14 about the hinge 66 is slightly less than the downward moment exerted by gravity on the ramp member 14 about the hinge 66 when the lip member 68 is folded down against the lip stops 90.

When a vehicle is in proper position to be loaded or unloaded using the apparatus 10, an operator grasps the hand grip 194 on the ramp member 14 and lifts the ramp member 14 thereby rotating it upwardly and rearwardly about the hinge 66. The upward lifting by the operator is supplemented by the upward urging by the spring assembly 16. As the upward rotation of the ramp member 14 continues, the moment arm, upon which the center of gravity of the ramp member 14 acts, continues to decrease with a resultant decrease in the downward moment of the ramp member 14. At the same time, the moment arm, upon which the spring assembly 16 acts, continues to increase as the ramp member 14 rotates upwardly.

The spring rates of springs 108 and 110 are such that, by proper preloading of the springs 108 and 110 by the adjusting bolt 100 and the adjusting nut 124 respectively, the ramp member 14 is totally counterbalanced by the spring assembly 16 when the ramp member 14 is elevated to an angle of approximately 8° to 10° above the horizontal with the lip member 68 remaining folded down against the lip stops 90. When the ramp member 14 is elevated to approximately 30° from the horizontal, the cable 156 which interconnects the second end 154 of the lip extending member 146 and the bracket 36 on the frame 12 becomes taut. When the cable 156 becomes taut, the convex cam surface 152 on the first end 150 of the lip extending member 146 is in rolling engagement with the roller 168 which is journaled on the bottom side 166 of the lip member 68. As the ramp member 14 continues its upward rotation beyond the 30° of elevation, the cable 156 causes the second end 154 of the lip extending member 146 to pivot downwardly about the pivotal connection of the lip extending member 146 to the bracket 144, which results in the upward rotation of the first end 150 of the lip extending memeber 146 about the same pivot point. The upward rotation of the first end 150 of the lip extending member 146 causes a resulting upward and outward camming action of the convex cam surface 152 against the roller 168 which in turn causes the lip member 68 to be rotated upwardly about its hinge connection 74. When the ramp member 14 reaches approximately 40 degrees of elevation about the horizontal, the convex cam surface 152 bears against the lower edge of the hinge 74 and the roller 168 seats in the depression 162 formed in the first end 150 of the lip extending member 146. The seating of the roller 168 in the depression 162 holds the lip extending member 146 in contact with the roller 168 thereby retaining the lip member 68 in a partially extended position. The partially extended position of the lip member 68 is approximately 25° below the fully extended position of the lip member 68.

When the ramp member 14 has reached the previously mentioned elevation of 40°, it is restrained from further elevation by the cable 156. However, in the interest of safety, a linkage 214 is provided which interconnects the ramp member 14 and the frame 12 to restrict the elevation of the ramp member 14 to approximately 45° in the event the cable 156 is disconnected.

With the lip member 68 in the partially extended position, the operator then steps on top of the ramp plate 62 thereby rotating the ramp member 14 downwardly about the hinge connection 66. It should be noted that when the lip member 68 is partially extended, the center of gravity of the ramp member 14 is shifted forward from the hinge 66 thereby increasing the downward moment of the ramp member 14 which assists the operator in overriding the upward urging of the spring assembly 16. As the ramp member 14 continues its downward rotation, the front edge 212 of the lip member 68 is brought into engagement with the top of the bed of the vehicle 216 which is to be loaded or unloaded as shown in FIG. 4. After the lip member 68 engages the bed of the vehicle, the ramp member 14 continues its downward motion thereby causing further upward rotation of the lip member 68 about the hinge 74 until the lip member 68 reaches its fully extended position. The lip member 68 is then locked in its fully extended position with the rear edge 70 thereof abutting the front edge 72 of the ramp plate 62 by means of the previously described latching operation of the latch member 190 as shown in FIG. 4.

The full extension of the lip member 68 causes a further shift of the center of gravity of the ramp member 14 forwardly from the hinge 66. This additional forward shift of the center of gravity of the ramp member 14 results in a further increase in the downward moment of the ramp member 14 which is sufficient to override the upward moment exerted on the ramp member 14 by the spring assembly 16 and keep the front edge 212 of the lip member 68 in contact with the bed of the vehicle 216. This increased downward moment of the ramp member 14 allows the ramp member 14 and the lip member 68 to rotate up and down about the hinge 66 in response to variations in height of the bed of the vehicle 216 being loaded or unloaded.

When the loading or unloading operation is completed, the operator again grasps the hand grip 194 and lifts the ramp member 14 thereby rotating the ramp member 14 upwardly about the hinge 66. The upward movement of the hand grip 194 simultaneously causes the upward rotation of the first end portion 196 of the latch member 190 about the bolt 192 and the downward rotation of the detent engaging surface 208 on the second end portion 200 of the latch member 190 which releases the detent 204 and allows the lip member 68 to drop by gravity to its downwardly folded position in front of the ramp member 14. It should be noted that the operator need only lift ths ramp member 14 high enough for the front edge 212 of the lip member 68 to clear the bed of the vehicle 216 being loaded or unloaded. The operator then steps on the top of the ramp plate 62 thereby lowering the ramp member 14 to the horizontal cross-traffic position at which time the front edge 212 of the lip member 68 engages the brackets 41 formed on the frame 12 thereby providing support for the ramp member 14 in the cross-traffic position.

If the vehicle should pull away while the lip member 68 and the ramp member 14 are still supported by the bed thereof, the ramp member and fully extended lip member 68 will rotate downwardly about the hinge 66 by means of gravity until the bolt 34 carried by the frame 12 engages the bottom side of the first end portion 196 of the latch member 190 thereby imparting upward rotation of the first end portion 196 about the bolt 192 with the resulting disengagement of the detent engaging surface 208 on the second end 200 of the latch member 190 from the detent 204 formed on the lip member 68. The lip member 68 is then rotated downwardly by gravity about the hinge 74. The downward rotation of the lip member 68, acting through the rigid link 182 pivotally secured thereto, causes a resultant downward rotation of the ramp elevating member 172 about its pivotal connection with the bracket 170 of the ramp member 14. As the ramp elevating member 172 rotates downwardly, the convex cam surface 176 formed thereon rollingly engages the ramp elevating roller 40 carried by the frame 12. Continued downward rotation of the ramp elevating member 172 causes the convex cam surface 176 to roll along the ramp elevating roller 40 thereby forcing the ramp member 14 to rotate upwardly about the hinge 66 to a position in which the ramp plate 62 is flush with the surrounding dock 210. The convex cam surface 176 is shaped such that when the second end 178 of the ramp elevating member passes over the ramp elevating roller 40, the ramp member 14 is raised slightly above the surrounding dock level, thus allowing the front edge 212 of the lip member 68 to rise clear of the brackets 41. When the second end 178 of the ramp elevating member 172 has passed over the ramp elevating roller 40, the lip member 68 has also reached its fully downwardly folded position with the bottom side 166 thereof in contact with the lip stops 90 formed on the front plate 80 of the ramp member 14. The ramp member 14 then falls by means of gravitational force, to the cross-traffic position with the front edge 212 of the lip member 68 supported by the brackets 41 of the frame 12. It should also be noted that when the ramp member 14 is in the cross-traffic position, the second end 178 of the ramp elevating member 172 has dropped to a position immediately behind the roller 40 thereby locking the lip member 68 in its fully downwardly folded position. This locking action by the ramp elevating member 172 is an added safety feature designed to prevent the accidental extension of the lip member 68 when the apparatus 10 is in the cross-traffic position.

From the foregoing, it will be apparent that the present invention provides a pit-type dock leveler which displays significant improvements in the dock leveler art and is easily operated, of simple construction and virtually maintenance-free.

Changes may be made in the combination and arrangement of parts or elements as heretofore set forth in the specification and shown in the drawings without departing from the spirit and scope of the invention.

What is claimed is:

1. A dock leveler for installation in a dock having a pit formed therein, comprising:

a frame, having a front portion, an upper rear portion and a lower rear portion;

a ramp member, having a top side, and a bottom side, a front edge and a rear edge, pivotally secured along the rear edge thereof to the upper rear portion of said frame for pivoting movement thereon about a horizontal axis;

means carried by said frame for upwardly biasing said ramp member relative to said frame;

a lip member, having a top side, a bottom side, a front edge and a rear edge, the rear edge thereof being pivotally secured to the front edge of said ramp member whereby the lip member pivots between an extended cantilever position, lying substantially in the plane of said ramp member, and a downwardly folded position, lying in a plane substantially normal to the plane of said ramp member;

lip extending member means, having a first end and a second end and pivotally secured at the medial portion thereof to the bottom side of said ramp member adjacent the front edge thereof, the first end of said lip extending member means being in operative contact with the bottom side of said lip member for rotating said lip member upwardly about its pivot point to an extended cantilever position when the first end of said lip extending member means is upwardly rotated about its pivotal securement to said ramp member;

means, responsive to the upward pivoting movement of said ramp member, for pivoting said lip extending member means, said means interconnecting the first end of said lip extending member means and the front portion of said frame;

a rigid one-piece detent formed on the bottom side of said lip member adjacent the rear edge thereof;

a latch member pivotally secured at its medial portion to the bottom side of said ramp member and having a hand grip formed on the first end portion thereof and a detent-engaging surface formed on the second end thereof, the mass of said latch member between the medial portion and the first end portion being greater than the mass between the medial portion and the second end whereby gravity acting on said latch member urges the first end portion thereof downwardly thereby biasing the detent-engaging surface thereof into abutment with said detent whereby said lip member is releasably retained in a fully extended cantilever position; and pedestal means carried by the front portion of said frame for contacting the first end of said latch member when said ramp member reaches its lowest position thereby urging the first end of said latch member upwardly against the urging of gravity and releasing said lip member from its fully extended cantilever position.

2. A dock leveler as defined in claim 1 wherein said means for pivoting said lip extending member means is a flexible cable.

3. A dock leveler as defined in claim 1 wherein said biasing means is provided by gravity acting on the first end portion of said latch member and urging it downwardly.

4. A dock leveler for installation in a dock having a pit formed therein, comprising:

a frame, having a front portion, an upper rear portion and a lower rear portion;

a ramp member, having a top side, and a bottom side, a front edge and a rear edge, pivotally secured along the rear edge thereof to the upper rear portion of said frame for pivoting movement thereon about a horizontal axis;

means carried by said frame for upwardly biasing said ramp member relative to said frame;

a lip member, having a top side, a bottom side, a front edge and a rear edge, the rear edge thereof being pivotally secured to the front edge of said ramp member whereby the lip member pivots between an extended cantilever position, lying substantially in the plane of said ramp member, and a downwardly folded position, lying in a plane substantially normal to the plane of said ramp member;

lip extending member means, having a first end and a second end and pivotally secured at the medial portion thereof to the bottom side of said ramp member adjacent the front edge thereof, the first end of said lip extending member means being in operative contact with the bottom side of said lip member for rotating said lip member upwardly about its pivot point to an extended cantilever position when the first end of said lip extending member means is upwardly rotated about its pivotal securement to said ramp member;

means, responsive to the upward pivoting movement of said ramp member, for pivoting said lip extending member means, said means interconnecting the second end of said lip extending member means and the front portion of said frame;

a detent formed on the bottom side of said lip member adjacent the rear edge thereof;

a latch member pivotally secured at its medial portion to the bottom side of said ramp member and having a hand grip formed on the first end portion thereof and a detent-engaging surface formed on the second end thereof, the mass of said latch member between the medial portion and the first end portion being greater than the mass between the medial portion and the second end whereby gravity acting on said latch member urges the first end portion thereof downwardly thereby biasing the detent-engaging surface thereof into abutment with said detent whereby said lip member is releasably retained in a fully extended cantilever position;

pedestal means carried by the front portion of said frame for contacting the first end of said latch member when said ramp member reaches its lowest position thereby urging the first end of said latch member upwardly against the urging of gravity and releasing said lip member from its fully extended cantilever position;

ramp elevating roller means journaled on the front portion of said frame and extending upwardly therefrom for elevating said ramp;

ramp elevating member means, having a first end, a second end and a medial portion, pivotally secured at the first end thereof to the bottom side of said ramp member and having a convex cam surface formed on the lower edge thereof for bearing on said ramp elevating roller means; and elongated rigid link means, having a first end and a second end, pivotally secured at the first end thereof to the bottom side of said lip member and pivotally secured at the second end thereof to the medial portion of said ramp elevating member means, for transmitting the downward movement of said lip member therethrough to said ramp elevating member means thereby causing the convex cam surface of said ramp elevating member means to move rollingly over said ramp elevating roller means thereby raising said ramp member to dock level from a position therebelow.

5. A dock leveler as defined in claim 4 characterized further to include:
   at least one bracket means formed on the front portion of said frame and extending outwardly and upwardly therefrom for supporting the front edge of said lip member when the lip member is in the downwardly folded position thereby rigidly supporting said ramp member at dock level in a horizontal cross-traffic position.

6. A dock leveler as defined in claim 5 wherein the passage of the second end of said ramp elevating member means over said ramp elevating roller means raises said ramp member slightly above the dock level thereby allowing the front edge of said lip member to rise above and seat in said bracket means.

7. A dock leveler as defined in claim 1 wherein said means for upwardly biasing said ramp member is characterized further to include:
   first compression spring means operatively connected at one end thereof to said frame and operatively connected at the opposite end thereof to the bottom side of said ramp member for biasing said ramp member upwardly relative to said frame; and
   adjusting means operatively disposed intermediate the opposite end of said first compression spring means and said ramp member for adjusting the preloading of said first compression spring means and thereby adjusting the magnitude of upward biasing of said ramp member relative to said frame.

8. A dock leveler as defined in claim 7 wherein said means for upwardly biasing said ramp member is characterized further to include:
   second compression spring means coaxially aligned with and carried within said first compression spring means for providing biasing supplemental to said first compression spring means; and
   preloading means for adjustably preloading said second compression spring means thereby adjusting the magnitude of bias provided by said second compression spring means supplemental to said first compression spring means to counterbalance said ramp member.

9. A dock leveler as defined in claim 8 wherein said first compression spring means is operatively connected at the one end thereof to the lower rear portion of said frame and is oriented in a generally vertical position.

10. A dock leveler as defined in claim 9 wherein said first and second compression spring means are adjusted by said adjusting means and preloading means, respectively, to counterbalance said ramp member when said ramp member is pivoted to a position slightly above the horizontal.

11. In combination with a dock leveler for installation on a dock having a pit formed therein of the type which comprises a frame, having a front portion, an upper rear portion, and a lower rear portion; a ramp member, having a top side, a bottom side, a front edge and a rear edge, pivotally secured along the rear edge thereof to the upper rear portion of said frame for pivoting movement thereon about a horizontal axis; means carried by said frame for upwardly biasing said ramp member relative to said frame; and a lip member, having a top side, a bottom side, a front edge and a rear edge, the rear edge thereof being pivotally secured to the front edge of said ramp member whereby the lip member pivots between an extended cantilever position, substantially lying in the plane of said ramp member, and a downwardly folded position, lying in a plane substantially normal to the plane of said ramp member, the improvement comprising:
   lip extending member means, having a first end and a second end and pivotally secured at the medial portion thereof to the bottom side of said ramp member adjacent the front edge thereof, the first end of said lip extending member means being in operative contact with the bottom side of said lip member for rotating said lip member upwardly about its pivot point to an extended cantilever position when the first end of said lip extending member means is upwardly rotated about its pivotal securement to said ramp member;
   means, responsive to the upward pivoting movement of said ramp member, for pivoting said lip extending member means, said means interconnecting the second end of said lip extending member means and the front portion of said frame;
   a rigid one-piece detent formed on the bottom side of said lip member adjacent the rear edge thereof;
   a latch member pivotally secured at its medial portion to the bottom side of said ramp member and having a hand grip formed on the first end portion thereof and a detent-engaging surface formed on the second end thereof, the mass of said latch member between the medial portion and the first end portion being greater than the mass between the medial portion and the second end whereby gravity acting on said latch member urges the first end portion thereof downwardly thereby biasing the detent-engaging surface thereof into abutment with said detent whereby said lip member is releasably retained in a fully extended cantilever position; and
   pedestal means carried by the front portion of said frame for contacting the first end of said latch member when said ramp member reaches its lowest position thereby urging the first end of said latch member upwardly against the urging of gravity and releasing said lip member from its fully extended cantilever position.

12. In combination with a dock leveler for installation in a dock having a pit formed therein of the type which comprises a frame, having a front portion, an upper rear portion, and a lower rear portion; a ramp member, having a top side, a bottom side, a front edge and a rear edge, pivotally secured along the rear edge thereof to the upper rear portion of said frame for pivoting movement thereon about a horizontal axis; means carried by said frame for upwardly biasing said ramp member relative to said frame; and a lip member, having a top side, a bottom side, a front edge and a rear edge, the rear edge thereof being pivotally secured to the front edge of said ramp member whereby the lip member pivots between an extended cantilever position, substantially lying in the plane of said ramp member, and a downwardly folded position, lying in a plane substantially normal to the plane of said ramp member, the improvement comprising:
   lip extending member means, having a first end and a second end and pivotally secured at thhe medial portion thereof to the bottom side of said ramp member adjacent the front edge thereof, the first end of said lip extending member means being in operative contact with the bottom side of said lip member for rotating said lip member upwardly about its pivot point to an extended cantilever position when the first end of said lip extending member means is upwardly rotated about its pivotal securement to said ramp member; means, responsive to the upward pivoting movement of said ramp member, for pivoting said lip extending member means, said means interconnecting the second end of said lip extending member means and the front portion of said frame;

a detent formed on the bottom side of said lip member adjacent the rear edge thereof;

a latch member pivotally secured at its medial portion to the bottom side of said ramp member and having a hand grip formed on the first end portion thereof and a detent-engaging surface formed on the second end thereof, the mass of said latch member between the medial portion and the first end portion being greater than the mass between the medial portion and the second end whereby gravity acting on said latch member urges the first end portion thereof downwardly thereby biasing the detent-engaging surface thereof into abutment with said detent whereby said lip member is releasably retained in a fully extended cantilever position;

pedestal means carried by the front portion of said frame for contacting the first end of said latch member when said ramp member reaches its lowest position thereby urging the first end of said latch member upwardly against the urging of gravity and releasing said lip member from its fully exteneded cantilever position;

ramp elevating roller means journaled on the front portion of said frame and extending upwardly therefrom for elevating said ramp member;

ramp elevating member means, having a first end, a second end and a medial portion, pivotally secured at the first end thereof to the bottom side of said ramp member and having a convex cam surface formed on the lower edge thereof for engaging said ramp elevating roller means; and elongated rigid link means, having a first end and a second end, pivotally secured at the first end thereof to the bottom side of said lip member and pivotally secured at the second end thereof to the medial portion of said ramp elevating member means, for transmitting downward movement of said lip member therethrough to said ramp elevating member means thereby causing the convex cam surface of said ramp elevating member means to move rollingly over said ramp elevating roller means thereby raising said ramp member to dock level from a position therebelow.

13. A dock leveler as defined in claim 12 characterized further to include:

at least one bracket means formed on the front portion of said frame and extending outwardly and upwardly therefrom for supporting the front edge of said lip member when the lip member is in the downwardly folded position, thereby rigidly supporting said ramp member at dock level in a horizontal cross-traffic position.

14. A dock leveler as defined in claim 13 wherein the passage of the second end of said ramp elevating member means over said ramp elevating roller means raises said ramp member slightly above the dock level thereby allowing the front edge of said lip member to rise above and seat in said bracket means.

15. A dock leveler for installation in a dock having a pit formed therein, comprising:

a frame, having a front portion, an upper rear portion and a lower rear portion;

a ramp member, having a top side, a bottom side, a front edge and a rear edge, pivotally secured along the rear edge thereof to the upper rear portion of said frame for pivoting movement thereon about a horizontal axis;

a lip member, having a top side, a bottom side, a front edge and a rear edge, the rear edge thereof being pivotally secured to the front edge of said ramp member, whereby the lip member pivots between an extended cantilever position, lying substantially in the plane of said ramp member, and a downwardly folded position lying in a plane substantially normal to the plane of said ramp member;

first compression spring means operatively connected at one end thereof to said frame and operatively connected at the opposite end thereof to the bottom side of said ramp member for providing upward biasing of said ramp member relative to said frame;

second compression spring means coaxially aligned with and carried within said first compression spring means for providing biasing supplemental to said first compression spring means;

adjusting means operatively disposed intermediate the opposite end of said first compression spring means and said ramp member for adjusting the preloading of said first compression spring means and thereby adjusting the magnitude of upward biasing of said ramp member relative to said frame; and preloading means operatively engaging said second compression spring means for adjustably preloading said second compression spring means thereby adjusting the magnitude of biasing provided lower said second compression spring means supplemental to said first compression spring means to counterbalance said ramp member.

16. A dock leveler as defined in claim 15 wherein said first compression spring means is operatively connected at one end thereof to the lower rear portion of said frame and is oriented in a generally vertical position.

17. A dock leveler as defined in claim 15 characterized further to include:

lip extending member means, having a first end and a second end and pivotally secured at its medial portion to the bottom side of said ramp member adjacent the front edge thereof, the first end of said lip extending member means being in operative contact with the bottom side of said lip member for rotating said lip member upwardly about its pivot point to an extended cantilever position when the first end of said lip member means is upwardly rotated about its pivotal securement to said ramp member; and means responsive to the upward pivoting movement of said ramp member for pivoting said lip extending member means, said means interconnecting the second end of said lip extending member means and the front portion of said frame.

18. A dock leveler as defined in claim 17 characterized further to include:

a detent formed on the bottom side of said lip member adjacent the rear edge thereof;

a latch member pivotally secured at its medial portion to the bottom side of said ramp member and having a hand grip formed on the first end portion thereof and a detent-engaging surface formed on the second end thereof for engaging said detent to releasably retain said lip member in a fully extended cantilever position.

19. A dock leveler for installation in a dock having a pit formed therein, comprising:

a frame, having a front portion, an upper rear portion and a lower rear portion;

a ramp member, having a top side, a bottom side, a front edge and a rear edge, pivotally secured along the rear edge thereof to the upper rear portion of said frame for pivoting movement thereon about a horizontal axis;

a lip member, having a top side, a bottom side, a front edge and a rear edge, the rear edge thereof being pivotally secured to the front edge of said ramp member, whereby the lip member pivots between an extended cantilever position, lying substantially in the plane of said ramp member, and a downwardly folded position lying in a plane substantially normal to the plane of said ramp member;

first compression spring means operatively connected at one end thereof to said frame and operatively connected at the opposite end thereof to the bottom side of said ramp member for providing upward biasing of said ramp member relative to said frame;

second compression spring means coaxially aligned with and carried within said first compression spring means for providing biasing supplemental to said first compression spring means;

lip extending member means, having a first end and a second end and pivotally secured at its medial portion to the bottom side of said ramp member adjacent the front edge thereof, the first end of said lip extending member means being in operative contact with the bottom side of said lip member for rotating said lip member upwardly about its pivot point to an extended cantilever position when the first end of said lip extending member means is upwardly rotated about its pivotal securement to said ramp member;

means responsive to the upward pivoting movement of said ramp member for pivoting said lip extending member means, said means interconnecting the second end of said lip extending member means and the front portion of said frame;

a detent formed on the bottom side of said lip member adjacent the rear edge thereof;

a latch member pivotally secured at its medial portion to the bottom side of said ramp member and having a hand grip formed on the first end portion thereof and a detent-engaging surface formed on the second end thereof, the mass of said latch member between the medial portion and the first end portion being greater than the mass between the medial portion and the second end whereby gravity acting on said latch member urges the first end portion thereof downwardly thereby biasing the detent-engaging surface thereof into abutment with said detent whereby said lip member is releasably retained in a fully extended cantilever position;

pedestal means carried by the front portion of said frame for contacting the first end of said latch member when said ramp member reaches its lowest position thereby urging the first end of said latch member upwardly against the urging of gravity and releasing said lip member from its fully extended cantilever position;

ramp elevating roller means journaled on the front portion of said frame and extending upwardly therefrom for elevating said ramp;

ramp elevating member means, having a first end, a second end and a medial portion, pivotally secured at the first end thereof to the bottom side of said ramp member and having a convex cam surface formed on the lower edge thereof for engaging said ramp elevating roller means; and elongated rigid link means, having a first end and a second end, pivotally secured at the first end thereof to the bottom side of said lip member and pivotally secured at the second end thereof to the medial portion of said ramp elevating member means, for transmitting downward movement of said lip member therethrough to said ramp elevating member means causing the convex cam surface of said ramp elevating member means to move rollingly over said ramp elevating roller means thereby raising said ramp member to dock level from a position therebelow.

20. A dock leveler as defined in claim 19 characterized further to include:

at least one bracket means formed on the front portion of said frame and extending outwardly and upwardly therefrom for supporting the front edge of said lip member when said lip member is in the downwardly folded position, thereby rigidly supporting said ramp member at dock level in a horizontal cross-traffic position.

21. A dock leveler as defined in claim 20 wherein the passage of the second end of said ramp elevating member means over said ramp elevating roller means raises said ramp member slightly above the dock level thereby allowing the front edge of said lip member to rise above and seat in said bracket means.

* * * * *